United States Patent [19]
Donlan et al.

[11] Patent Number: 6,039,965
[45] Date of Patent: Mar. 21, 2000

[54] SURFANCTANTS FOR REDUCING BACTERIAL ADHESION ONTO SURFACES

[75] Inventors: Rodney M. Donlan, Bridgeville; David L. Elliot, Imperial; Nancy J. Kapp, Glenshaw; Christopher L. Wiatr, McMurray; Paul A. Rey, Moon Township, all of Pa.

[73] Assignee: Calgon Corporation, Pittsburgh, Pa.

[21] Appl. No.: 08/929,909

[22] Filed: Sep. 15, 1997

Related U.S. Application Data

[60] Provisional application No. 60/026,909, Sep. 27, 1996, and provisional application No. 60/026,844, Sep. 27, 1996.

[51] Int. Cl.[7] .................................................. A01N 25/04
[52] U.S. Cl. ..................... 424/405; 424/76.8; 424/78.09; 424/78.18; 424/78.26; 424/78.31; 424/78.37; 574/772.4; 523/122
[58] Field of Search .................................. 424/404–406, 424/76.8, 78.18, 78.09, 78.26, 78.31, 78.37; 574/772.3, 772.4, 937; 523/122

[56] References Cited

U.S. PATENT DOCUMENTS

| | | | |
|---|---|---|---|
| 5,132,306 | 7/1992 | Hsu | 574/241 |
| 5,453,275 | 9/1995 | Terry et al. | 424/405 |
| 5,466,437 | 11/1995 | Gaffar et al. | 424/52 |

FOREIGN PATENT DOCUMENTS

| | | |
|---|---|---|
| 1269584 | 5/1990 | Canada . |
| 249854 | 5/1986 | Czechoslovakia . |
| 0385676 | 9/1990 | European Pat. Off. . |
| 2218708 | 11/1989 | United Kingdom . |
| WO93/06180 | 4/1993 | WIPO . |

OTHER PUBLICATIONS

T. Tashiro, Removal of *Escherichia coli* from water by systems based on insoluble polystyrene–poly (ethylene glycol)s,—polyethylenimines, and—polyethylenepolyamines quaternized), *J. Applied Polymer Science*, vol. 43, 1369–1377 (1991).

H. Ridgway et al., "Bacterial adhesion and filing of reverse osmosis membranes", *Research and Technology* (Jul. 1985), 97–106.

D. Blainey and K. Marshall, "The Use of Block Copolymers To Inhibit Bacterial Adhesion and Biofilm Formation on Hydrophobic Surfaces in Marine Habitats", *Biofouling*, 1991, vol. 4, pp. 309–318.

C.Wiater, "Development of Biofilms", TAPPI Proceedings: 1994 Biological Sciences Symposium, 203–223.

L. Robertson, "Prevention of Microbial Adhesion", TAPPI Proceedings: 1994 Biological Sciences Symposium, 225–232.

L. Robertson and N. Taylor, "Biofilms and Disbursents: A Less–Toxic Approach to Deposit Control", *TAPPI Journal* (Apr. 1994, vol. 77, No. 4, 99–103.

Abstract Accession No. 79:100956 CA, "Inhibition of Staphylococcus Aureus by Combinations of Non–Ionic Surface Active Agents and Antibacterial Substanes", Authored by M.C. Allwood, Department of Pharmacy, University of Manchester, Manchester, England, *Microbios* (1973), 7(28), 209–214.

M.J. Bridgett et al., "Control of Staphylococcal Adhesion to Polystyrene Surfaces by Polymer Surface Modification With Surfactants", *Biomaterials* 1992, vol. 13, No. 7, pp. 411–416.

M.Humphries et al., "The Use of Non–Ionic Ethoxylated Propoxylated Surfactants to Prevent the Adhesion of Bacteria to Solid Surfaces", *FEMS Microbiology Letters* 42 (1987) 91–101.

"Krajowy dyspergator osadów do uzdatniania chlodzacej wody obiegowej w przemyśle chemicznym", *Przemysl Chemiczny*, 68/12 (1989), 544–546.

M. Humphries, et al., "the effect of a range of biological polymers and synthetic surfactants on the adhesion of a marine Pseudomonas sp. strain NCMB 2021 to hydrophilic and hydrophobic surfaces", *FEMS Microbiology Ecology* 38(1986), p. 299–308.

*Primary Examiner*—Neil S. Levy
*Attorney, Agent, or Firm*—Webb Ziesenheim Logsdon Orkin & Hanson, P.C.

[57] ABSTRACT

A method for inhibiting microbial colonization of a surface in contact with an aqueous system is disclosed, which comprises adding to the system an amount of at least one compound including repeating ethylene oxide units.

21 Claims, 6 Drawing Sheets

SURFANCTANTS FOR REDUCING BACTERIAL ADHESION ONTO SURFACES

CROSS-REFERENCE TO RELATED APPLICATIONS

This application claims priority under 35 U.S.C. § 119(e) from U.S. application Ser. Nos. 60/026,909 and 60/026,844, both filed on Sep. 27, 1996.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention relates to methods for inhibiting microbial colonization and resultant development of biofilms on surfaces in contact with aqueous systems, and more particularly relates to methods of using compounds including repeating ethylene oxide units to reduce the adherence of bacteria on surfaces. The methods of the invention may be used in any application wherein it is desirable to prevent the adherence of bacteria on surfaces subjected to static or flowing water. The methods of the invention find particular applicability in industrial water system applications, such as, for example, process or cooling water systems, wherein the adherence of bacteria may lead to the undesirable formation of biofilms.

BACKGROUND OF THE INVENTION

Biofilms are considered indigenous to industrial water systems and may result in a number of serious problems, including fouling of heat exchangers and cooling tower fill materials, microbially-influenced corrosion; reseeding of the water system with biofilm organisms, plugging of orifices or piping, and final product or process stream complications.

It has been determined that biofilms are not merely comprised of monolayers of bacterial cells embedded in a polysaccharide matrix, but rather are heterogeneous assemblages of cells, extracellular polymeric substances (EPS), and abiotic particles (clay, diatom frustules, corrosion and mineral deposits). See W. G. Characklis, "Microbial Fouling," in W. G. Characklis and K. C. Marshall (eds.), *Biofilms* (John Wiley & Sons, N.Y., 1990), pp. 523–584; R. M. Donlan, "Correlation Between Sulfate Reducing Bacterial Colonization and Metabolic Activity on Selected Metals in a Recirculating Cooling Water System," National Association of Corrosion Engineers, Technical Paper No. 83, Nashville, Tenn. Further, research has demonstrated that microbially-produced polymers responsible for initial bacterial adherence to surfaces may not be the same as those involved in cell-to-cell interactions within the biofilm (the biofilm matrix polymers). M. Fletcher, et al., "Bacterial Surface Adhesives and Biofilm Matrix Polymers of Marine and Freshwater Bacteria," *Biofouling*, 4:129–140 (1991). J. S. Gill, et al., "Fouling of Film Forming Cooling Tower Fills—A Mechanistic Approach," CTI Journal, 16, 1:10–19 (1995), demonstrated that the matrix EPS will act as a "glue" or matrix for entrapment of clay particles on high-efficiency PVC fill material in recirculating cooling water systems.

SUMMARY OF THE INVENTION

The present invention discloses a method for inhibiting the microbial colonization of a surface in contact with an aqueous system by adding to the aqueous system at least one compound that will inhibit adhesion of microorganisms. The present method more specifically includes adding to the system an effective amount of at least one compound having repeating ethylene oxide units.

The compounds used in the method of the present invention may be, for example, an ethoxylated nonionic surfactant and, more particularly, may be selected from block copolymers of repeating ethylene oxide and repeating propylene oxide units, polysiloxanes including pendent polyethylene oxide grafts, alcohol ethoxylates including hydrophilic head groups and hydrophobic tail groups, and sorbitan monooleates including about 20 ethylene oxide units.

The block copolymers useful in the method of the present invention may be selected from, for example, block copolymers including first and second blocks of repeating ethylene oxide units and a block of propylene oxide units interposed between said first and second blocks of repeating ethylene oxide units. Such block copolymers may have the general structure (I):

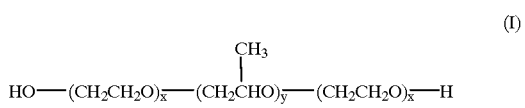

wherein x and y are each independently 5–1000. Thus, the two "x" values in the above structure (I) need not be identical. The block copolymers of the above structure (I) may include from 20–80% ethylene oxide (EO) units by weight and have a molecular weight in the range from 2000–20,000. Additional examples of block copolymers useful in the method of the present invention include those wherein the copolymers include first and second blocks of repeating propylene oxide units and a block of repeating ethylene oxide units interposed between first and second blocks of repeating propylene units. Such block copolymers may have the general structure (II):

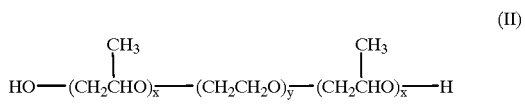

wherein x and y are each independently 5–1000. Thus, the two "x" values in the above structure (II) need not be identical. The block copolymers of the above structure (II) may include from 20–80% ethylene oxide (EO) units by weight and have a molecular weight in the range from 2000–10,000. In the case of either the EO-PO-EO block copolymer (I) or the PO-EO-PO block copolymer (II), it is preferred that the hydrophilic-lipophilic balance be in the range of 7–24.

The methods of the present invention preferably include adding the ethylene oxide-containing compounds to the aqueous system containing the surface in an amount of at least 0.25 ppm, and more preferably in an amount of at least 50 ppm.

It is contemplated that the methods of the present invention may be used to inhibit adherence of microorganisms in any system wherein a surface is in contact with an aqueous system. Examples of specific applications of the present methods include use in process and cooling water systems, pulping systems, and papermaking systems.

DETAILED DESCRIPTION OF THE INVENTION

Figure 1:
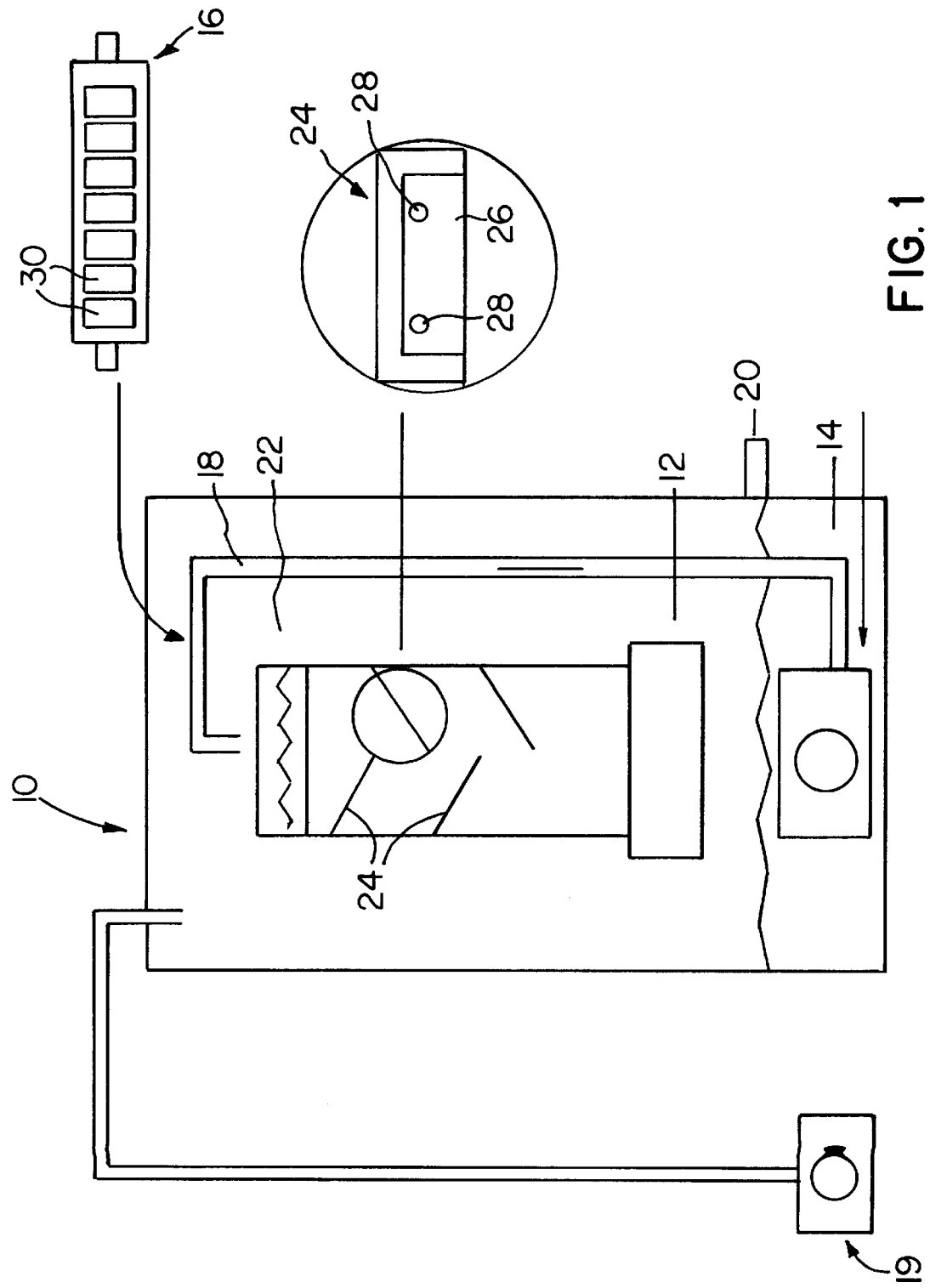
FIG. 1 is a schematic view of the apparatus used by the present inventors to perform both Lab and Field Recirculating Water System (RWS) experiments.

The inventors initiated laboratory and field studies to investigate novel treatments to minimize or control biofilms. The focus of the work was on treatments which would minimize the adhesion of bacteria to surfaces, a process which will lead to biofilm development. Surfactants have shown some efficacy in minimizing bacterial adherence in aquatic systems, and were investigated using several different types of assays. Results using a simple screening technique indicated that the nonionic surfactants worked more effectively than anionic or cationic surfactants. Those products containing ethylene oxide and propylene oxide units (EO/PO block copolymers) worked best in minimizing adherence. These products were then examined in lab systems containing microbial consortia and continuously flowing conditions, where threshold limits for surfactant performance under these conditions were determined. Evaluations under more complex conditions, at a power plant site, using plant recirculating cooling water, determined threshold performance for reduction in adherence in these systems. Comparison of data from all these studies enabled determination of a relationship between lab and field performance. Treatment with 0.25 ppm of product yielded >95% reduction in adherence in the screening assay. Approximately 40 times this amount (10 ppm) was required to provide significant reduction in lab recirculating water systems and 200 times this amount (50 ppm) was required for significant minimization under field conditions. Studies investigating mechanisms of surfactant efficacy indicated that surfactant molecules acted primarily by alteration of substratum surface hydrophobicity rather than by alteration of cell surface charge.

This application hereby incorporates herein by reference the entire disclosure of co-pending U.S. application Ser. No. 60/026,844, filed on even date herewith.

I. Materials and Methods a. Apparatus/Testing Protocol

Three different apparatus designs were used. The 96 Well plate/urease assay system (designated screening assay) was used for preliminary screening of surfactants. Those surfactants which performed well in the initial screen were then evaluated under more complex, dynamic conditions in recirculating water systems (Lab RWS). Finally, a select number of surfactants were evaluated under actual cooling systems conditions, with an apparatus similar to the Lab RWS (designated Field RWS). These field studies were performed at a fossil fuel power plant in Pennsylvania using plant recirculating cooling water (river water makeup).

b. Laboratory Screening Assay

A culture of *Klebsiella aerogenes* (wild type isolate) was restreaked on a fresh plate of Standard Methods Agar. This plate was incubated for 24 hours at 37° C. 150 ml of sterile Trypticase Soy Broth contained in a tissue culture flask was then inoculated with a swab which had been streaked across the plate. This flask was then placed into a 37° C. water bath and shaken at 80 rpm overnight (17 hours). As a rule, the culture was inoculated around 4:30 P.M. and removed approximately 9:00 A.M. the next morning. Thirty ml of this culture was then added to a sterile centrifuge tube and centrifuged at 70 rpm for 30 minutes to concentrate the bacterial cells and achieve a pellet with clear supernatant. The supernatant was discarded using a pipet, and the pellet washed twice with sterile phosphate buffered water (pH 7.2). It was spun down at 70 rpm for 30 minutes, vortexing the cells after each addition of buffer. Approximately 20 ml of sterile phosphate buffered water was added to the tube. The optical density (OD$_{600}$) was measured in a Bausch and Lomb Spec 21 spectrophotometer to determine the starting inoculum cell concentration. The OD$_{600}$ should be around 0.45–0.55, which equates to approximately 10$^8$ cells per ml. Generally, a plate count was also run on this cell suspension using Standard Methods Agar.

A Corning 96-Well, round bottom, tissue culture treated polystyrene plate was used for the assay. While the culture was spinning down, individual treatments were prepared. Triplicate treatments for each dosage concentration were run. Treatments were added to each well prior to inoculation. After treatments were added, sterile phosphate buffered water (pH 7.2), followed by the bacterial culture were added to each well (except the negative control). Each well was then mixed, using the mix function on the automatic micropipettor (Matrix Technologies, Lowell, Mass.). Once mixed, the plate was incubated at 37° C. for 24 hours.

After the 24-hour incubation, a tube of sterile urease substrate reagent was removed from refrigeration (Cat. no. US101U, Chemicon International, Inc., Temecula, Calif.). The Plate Reader (Dynatech MR5000 Automatic Microplate Reader, Dynatech, Chantilly, Va.) was programmed for 51.7° C., equivalent to 37° C. in the microwells. The plate was then removed from the incubator. The liquid was removed from each well by aspiration with a Pasteur pipette. After aspiration, sterile phosphate-buffered water was added to each well and aspirated again. This procedure was repeated thrice (a total of four washes). This step will remove any cells which are nonadherent on the well surface. The urease substrate reagent was then added to each well. The plate was then placed into the Dynatech Plate Reader and a colorimetric method developed to quantify presence of urease within bacterial cells was run.

c. Lab and Field RWS Design

The schematic of the apparatus used for both Lab and Field RWS is shown in FIG. 1. It was comprised of a 20-liter volume polycarbonate tank (10) which contains a small polycarbonate tower (12). Water was pumped by recirculating pump (15) from the 8-liter volume sump (14) through a Biofilm Sampling Device (BSD) (16) at 1.5 gallons per minute (which equates to 2.5 linear feet per second) then back over the tower (12). The BSD (16) is shown enlarged in FIG. 1 and was installed in water recirculating lines (18) in the position indicated. The tank (10) also included blowdown (20) at its 8-liter mark. The tower (12) was constructed so that the water flows onto a "deck" (22) containing evenly spaced small holes, down through a fill pack of PVC fill material and down across slats (24), each of which contained one or more fill pieces (26). A slat (24) and one fill piece (26) contained thereby is shown in a relative enlarged view in the circled portion of FIG. 1. The fill pieces (26) were made of PVC material (obtained from Munters Corporation, Fort Myers, Fla.) and were attached to the slats (24) using stainless steel screws (28). The Biofilm Sampling Device (16) contained multiple removable cylinders (30) ($9/16$ inch I.D., $13/16$ inch O.D., ½ inch long) constructed of CPVC material. Examination of the C-PVC material using Electron Spectroscopy for Chemical Analysis (ESCA) indicated that the measurable elemental components were: carbon (72.77%), oxygen (13.30%), nitrogen (0.11%), silicon (5.32%), chlorine (7.16%), and sodium (1.34%). Cylinders (30) were washed in a detergent solution, then rinsed in isopropanol and sterile phosphate-buffered water prior to installation in the BSD component (16) of the Recirculating Water System. The flow rate through the BSD (16) was controlled by a flowmeter. Makeup water containing treatments was fed by means of Masterflex pumps (19) (Cole Parmer Co., Niles, Ill.). The RWS has a retention time of 48 hours. Average water temperature was 300 C for lab RWS and 26° C. for Field RWS.

Lab RWS were inoculated as follows. Ten grams of algal mat material collected from a fouled, untreated Lab RWS was added to 100 ml Butterfield Buffer in a Waring Blender, suspended by mixing one minute on the "mix" function, then 20 ml was added to each Lab RWS. This algal mat was shown to contain Phormidium spp., Oscillatoria spp., Anabaena spp., and diatoms as the primary algal components. Nine separate bacterial cultures, originally isolated from untreated Lab RWS biofilms on R2A medium, were purified, identified using the fatty acid profile analysis procedure, and frozen at –70° C. Each of these cultures was inoculated into R2A Broth, grown up at 30° C. to turbidity, and then 1 ml from each was added to each LRWS. The organisms identified were as follows: *Bacillus subtilis, Bacillus amyloliguefacians, Bacillus cereus, Pseudomonas saccharophila*, with the remainder being unmatched gram negative organisms. Field RWS used indigenous microorganisms; therefore, they were not inoculated.

d. Bulk Water Measurements

Water chemistry measured in Lab RWS studies is shown in Table 1. This water was municipal tap water dechlorinated with 18 mg/l sodium thiosulfate. Table 2 shows water chemistry for Field RWS, made up with plant recirculating cooling water. Table 3 shows bulk water plate counts for both Lab and Field RWS.

TABLE 1

Water Chemistry of Lab RWS Using Dechlorinated Tap Water

| Analyte | Conc.* | Analyte | Conc.* |
| --- | --- | --- | --- |
| pH @ 25 C. | 8.0 units | Magnesium | 9.0 mg/L |
| M Alkalinity | 48 mg/L CaCO3 | Sodium | 3 1 mg/L |
| Conductivity | 410 umhos | Potassium | 2.0 mg/L |
| Suspended Solids | Not Run | Iron | <0.05 mg/L |
| HCO3 | 59 mg/L | Copper | <0.05 mg/L |
| Chloride | 25 mg/L | Manganese | <0.05 mg/L |
| Nitrite | <5 mg/L | Aluminum | <0.1 mg/L |
| Nitrate | <2 mg/L | Zinc | 0.05 mg/L |
| Orthophosphate | <2 mg/L | Nickel | <0.05 mg/L |
| Sulfate | 95 mg/L | Chromium | <0.05 mg/L |
| Calcium | 36 mg/L | | |

*Each value is the result of measurement on one sample.

TABLE 2

Water Chemistry of Field RWS Using Power Plant Recirculating Cooling Water

| Analyte | Conc.* | Analyte | Conc.* |
| --- | --- | --- | --- |
| pH @ 25 C. | 7.6 units | Magnesium | 32 mg/L |
| M Alkalinity | 68 mg/L CaCO3 | Sodium | 55 mg/L |
| Conductivity | 1100 umhos | Potassium | 6.5 mg/L |
| Suspended Solids | 5 mg/L | Iron | 0.1 mg/L |
| HCO3 | 83 mg/L | Copper | <0.05 mg/L |
| Chloride | 28 mg/L | Manganese | <0.05 mg/L |
| Nitrite | <10 mg/L | Aluminum | <0.3 mg/L |
| Nitrate | <32 mg/L | Zinc | <0.05 mg/L |
| Orthophosphate | <4 mg/L | Nickel | <0.05 mg/L |
| Sulfate | 420 mg/L | Chromium | <0.05 mg/L |
| Calcium | 140 mg/L | | |

*Each value is mean of 3 samples.

TABLE 3

Average Heterotrophic Plate Count Data from Untreated Lab and Field Recirculating Water Systems

| | CFU/mL × $10^4$ | | |
| --- | --- | --- | --- |
| Makeup Water Source | Mean | S.D. | no. samples |
| Dechlorinated Tap Water (Lab) | 3.63 | 1.56 | 12 |
| Plant Recirc. Water (Field) | 30.3 | 13.5 | 6 | e. Biofilm Sampling and Measurements in LWRS

For cylinder samples, the submersible recirculating water pump (FIG. 1) was turned off to stop flow through the BSD (16). Alcohol sterilized pliers were then used to remove cylinders from the BSD. Each cylinder was first rinsed gently in sterile phosphate buffered water to remove reversibly attached cells prior to placing it into a sterile glass tube which contained homogenization solution and 3 mm glass beads. This homogenization solution contained peptone-20 grams, Zwittergent-0.0067 grams (Calbiochem, La Jolla, Calif.), ethylenebis (oxyethylenentrilo) tetraacetic acid (EGTA)-7.6 grams, tris (hydroxymethyl) aminomethane (Tris Buffer)-24.2 grams, and deionized water-200 ml, adjusted with 1:1 HCl to pH 7 and autoclaved, after which it was diluted 1:10 with sterile Butterfield Buffer, pH 7.2. The tube containing the cylinder was then vortexed at a speed of 10 on a Vortex Genie Mixer (Fisher Scientific, Pittsburgh, Pa.) for one minute. This "biofilm suspension" was then diluted and pour plated onto R2A medium (Difco Laboratories, Detroit, Mich.) and incubated for 48 hours at 30° C. and counted. Counts were based on number of colony forming units per total cylinder surface area and recorded as biofilm plate counts. For each experiment run, an untreated RWS (either Lab or Field) was run alongside the treated system. Percent reduction in bacterial adherence was calculated by the formula:

$$\frac{A - B}{A} \times 100 = \% \text{ Reduction}$$

where:

A=biofilm plate count of the treated RWS

B=biofilm plate count of the untreated RWS

For field sampling, cylinders (30) were removed from the BSD (16) and placed into sterile PVC shipping tubes which were filled with sterile Butterfield Buffer. These were then transported to the lab where they were processed within 24 hours. Cylinders collected in the field were not rinsed in Butterfield Buffer prior to analysis since shipment in this solution was considered equivalent to rinsing.

f. Test Solutions and Treatments

All surfactants used in these test procedures, shown in Tables 4, 5, and 6 below, were made up in deionized water based on product weight, not on active basis. For treatment studies in lab RWS, surfactants were fed continuously into the LRWS using Masterflex pumps. For studies in which clay was added to Lab RWS, kaolinite and bentonite clays were mixed in deionized water in a proportion of 0.041 grams bentonite (Calgon Coagulant Aid CA36 Specialty Clay, Calgon Corp., Pittsburgh, Pa.) to 0.097 grams kaolinite (Engelhard Ultra Gloss 90, Coating Grade Kaolinite, Engelhard Corporation, Edison, N.J.) per liter. This slurry was then pumped continuously into the LRWS sump at a rate of 2.0 ml per minute which, when diluted with makeup water (including treatment) equated to a final clay concentration of approximately 50 mg/L.

TABLE 4

Nonionic Surfactants
Evaluated for Reduction in Bacterial Adherence

| Chemical Name | Trade Name | Functional Group | Supplier | HLB |
|---|---|---|---|---|
| Silicone glycol ether | Silwet L-720 | Polysiloxane with PEG side chains | OSi Specialties | 8–11 |
| Nonylphenol ethoxylate (4EO) | Macol NP4 | $PEO_4$ with nonylphenol tail | PPG | 8.8 |
| Nonylphenol ethoxylate (5EO) | Igepal CO-520 | $PEO_5$ with nonylphenol tail | Rhone-Poulenc | 10 |
| Nonylphenol ethoxylate (8EO) | Igepal CO-620 | $PEO_8$ with nonylphenol tail | Rhone-Poulenc | 12 |
| Linear alcohol ethoxylate | Neodol 25-12 | $C_{12-15}$ alkyl with 12 EO units | Shell Chemicals | 14.4 |
| Linear alcohol ethoxylate | Neodol 25-7 | $C_{12-15}$ alkyl with 7 EO units | Shell Chemicals | 12.3 |
| Linear alcohol ethoxylate | Neodol 91-2.5 | $C_{9-11}$ alkyl with 2.5 EO units | Shell Chemicals | 8.5 |
| Alkyl polyglycoside | Glucopon 225CS | $C_{8-10}$ alkyl polysaccharide ether | Henkel/ Emery Group | 13.5 |
| Nonionic vinyl polymer | Sokalan HP53 | Polyvinyl pyrrolidone, low molecular weight | BASF | N/A |

TABLE 4-continued

Nonionic Surfactants
Evaluated for Reduction in Bacterial Adherence

| Chemical Name | Trade Name | Functional Group | Supplier | HLB |
|---|---|---|---|---|
| Sorbitan Monooleate | T-MAZ 80 | $PEO_{20}$ sorbitan monooleate | PPG | 15.0 |
| Sorbitan Monostearate | Emsorb 6906 | $PEO_3$ sorbitan monostearate | Henkel/ Emery Group | 9.0 |
| Sorbitan Monooleate | Tween 80 | $PEO_{20}$ sorbitan monooleate | ICI | 15.0 |
| Ethylene oxide Propylene oxide Copolymer | Pluronic F68 | EO-PO-EO block copolymer, high EO content, MW 8400 | BASF | 24 |
| Ethylene oxide Propylene oxide Copolymer | Pluronic 17R8 | PO-EO-PO block copolymer, high EO content, MW 7000 | BASF | 12–18 |
| Ethylene oxide Propylene oxide Copolymer | Pluronic 25R2 | PO-EO-PO block copolymer, high PO content, MW 3100 | BASF | 2-7 |
| Ethylene oxide Propylene oxide Copolymer | Pluronic 25R4 | PO-EO-PO block copolymer, high EO content, MW 3600 | BASF | 7-12 |
| Ethylene oxide Propylene oxide Copolymer | Pluronic 25R8 | PO-EO-PO block copolymer, high EO content, MW 8500 | BASF | 12–18 |
| Ethylene oxide Propylene oxide Copolymer | Pluronic F108 | EO-PO-EO block copolymer, high EO content, MW 14600 | BASF | 24 |
| Ethylene oxide Propylene oxide Copolymer | Pluronic L64 | EO-PO-EO block copolymer, high EO content, MW 2900 | BASF | 12–18 |
| Ethylene oxide Propylene oxide Copolymer | Pluronic L62D | EO-PO-EO block copolymer, high PO content, MW 2400 | BASF | 1–7 |
| Ethylene oxide Propylene oxide Copolymer | Pluronic P103 | EO-PO-EO block copolymer, high EO content, MW 5000 | BASF | 7–12 |

TABLE 5

Anionic Surfactants
Evaluated for Reduction in Bacterial Adherence

| Chemical Name | Trade Name | Supplier | Functional Group |
|---|---|---|---|
| Distilled Tall Oil | N/A | N/A | Unsaturated Alkylene carboxylate |
| Diisobutyl sodium sulfosuccinate | Monawet MB-45 | Mona | Sulfosuccinic acid, sodium salt |
| Naphthalene sulfonate formaldehyde condensate | Petro 22 | Witco Corp. | Mixture of naphthalene sulfonate-based surfactants |
| Naphthalene sulfonate formaldehyde condensate | Petro Dispersant 425 | Witco Corp. | Sulfonated naphthalene/ formaldehyde, low molecular weight |
| Alpha-olefin sulfonates | Witconate AOS | Witco Corp. | Sulfonated alkylenes |
| Linear alkylaryl sodium sulfonate | Witconate 1260 | Witco Corp. | Sulfonated alkylaryl |
| Phosphorylated alkyl, acid form | Triton QS-44 | Union Carbide | Alkyl surfactant, phosphated form |
| Modified sulfonated lignin | Dynasperse A | Lignotech USA | Sulfonated lignin/ formaldehyde condensate |

TABLE 6

Amphoteric/Cationic Surfactants
Evaluated for Reduction in Bacterial Adherence

| Chemical Name | Trade Name | Supplier |
|---|---|---|
| $C_{12}$ Dimethyl amine oxide | Barlox 12 | Lonza |
| Cocoamine oxide | Mackamine CO | McIntyre |
| Tallow hydroxyethyl imidazoline | Varine T | Sherex | g. Instrumentation

Zeta potential measurements were determined using a Zeta Sizer 3 (Malvern Instruments Inc., Southborough, Mass.). Contact angle measurements were determined using a Kruss Processor Tensiometer K-12 (Kruss Instruments, Charlotte, N.C.). In both cases, measurements were made according to manufacturer's instructions. Electron Spectroscopy for Chemical Analysis (ESCA) was performed using a Physics Electronics Laboratories PHI-5600 ESCA spectrometer.

II. Experimental Results a. Screening Assay Results

Cationic, anionic, nonionic and amphoteric surfactants were all evaluated in the screening assay. These surfactants were selected to cover the broadest range possible of chemical structures, type of head/tail groups, ionic charge, and water solubility. Ethoxylated surfactants were among the surfactants considered, as well as other possible bacterial adherence reduction mechanisms, including dispersion by anionic agents or partitioning via hydrophobic (or poorly water soluble) agents. Tables 7 and 8 present results of these evaluations. Each product was tested at decreasing concentrations of surfactant until a dosage was found which did not prevent at least 90% of bacteria from adhering to the substratum. At 0.25 ppm product, there were 11 of the original 32 surfactants which provided greater than 90% reduction in adherence. These were the products which were further evaluated under more complex and dynamic conditions in Lab and Field RWS.

TABLE 7

Percent Reduction in Bacterial
Adherence onto Tissue Culture Treated Polystyrene
Plates After 24 Hours' Exposure to Different Surfactants

| Surfactant | 2.0 ppm | 1.0 ppm | 0.5 ppm | 0.25 ppm |
|---|---|---|---|---|
| Barlox 12 | 20.7 | 0 | Not Run | Not Run |
| Mackamine CO | 32.2 | 47.5 | 6.08 | Not Run |
| Varine T | 92.3 | 99.3 | 98.8 | 12.5 |
| Silwet | 98.9 | 97.7 | 99.8 | 97.1 |
| Igepal 520 | 92.5 | 96.1 | 38.4 | Not Run |
| Igepal 620 | 99.3 | 97.7 | 51.6 | Not Run |
| Macol NP4 | 21.4 | 91.3 | 6.42 | Not Run |
| Neodol 25-12 | 99.7 | 98.4 | 98.6 | 97.0 |
| Neodol 25-7 | 99.9 | 100 | 98.7 | 49.5 |
| Neodol 91-2.5 | 87.1 | 4.98 | Not Run | Not Run |
| Pegol F68 | 99.9 | 98.3 | 70.6 | Not Run |
| Pluronic 17R8 | 99.7 | 95.5 | 98.4 | 98.9 |
| Pluronic 25R2 | 98.4 | 98.3 | 98.8 | 94.4 |
| Pluronic 25R4 | 95.6 | 98.6 | 97.7 | 98.8 |
| Pluronic 25R8 | 98.9 | 98.6 | 99.7 | 99.0 |
| Pluronic F108 | 98.8 | 97.9 | 96.4 | 99.8 |

TABLE 8

Percent Reduction in Bacterial
Adherence onto Tissue Culture Treated Polystyrene
Plates After 24 Hours' Exposure to Different Surfactants

| Surfactant | 2.0 ppm | 1.0 ppm | 0.5 ppm | 0.25 ppm |
|---|---|---|---|---|
| Pluronic L64 | 99.6 | 97.2 | 98.6 | 99.5 |
| Pluronic L62D | 97.8 | 95.8 | 87.1 | Not Run |
| Pluronic P103 | 99.7 | 100 | 99.4 | 99.7 |
| Emsorb 6901 | 93.1 | 99.2 | 63.2 | Not Run |
| T-MAZ 80 | 98.2 | 99.1 | 99.4 | 95.7 |
| Tween 80 | NotRun | 100 | 98.8 | 99.4 |
| Sokalan HP53 | 100 | 100 | 64.1 | Not Run |
| Tall Oil | Not Run | Not Run | 0 | Not Run |
| Monawet | 82.6 | 83.8 | 0.51 | Not Run |
| Petro Disp. 425 | 41.9 | 62.1 | 0 | Not Run |
| Witconate 1260 | Not Run | Not Run | 11.6 | Not Run |
| Witconate AOS | 23.4 | 31.3 | Not Run | Not Run |
| Triton QS44 | 0 | Not Run | Not Run | Not Run |
| Petro 22 | Not Run | Not Run | 9.9 | Not Run |
| Glycoside | 31.8 | 85.5 | 6.4 | Not Run |
| Lignosulfonate | 62.9 | 77.3 | 5.2 | Not Run | b. Lab RWS Results

Figure 2:
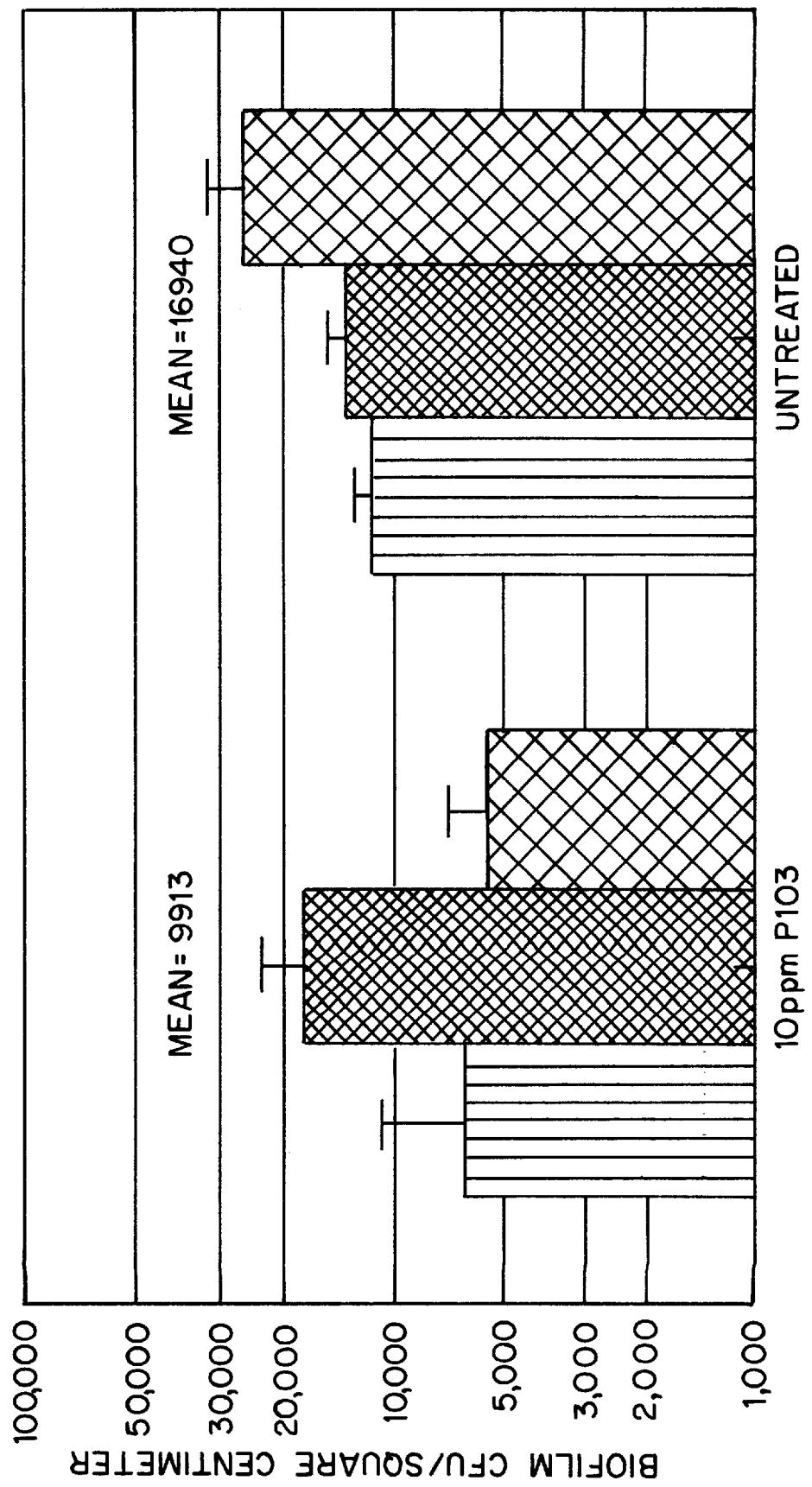
FIG. 2 is a plot showing the effect of addition of Pluronic P 103 surfactant on bacterial adherence on PVC exposed to treatment for 24 hours as measured by colony forming units per square centimeter (cfu/cm$^2$), each bar showing results from a single RWS run, and standard errors shown by brackets.
Figure 3:
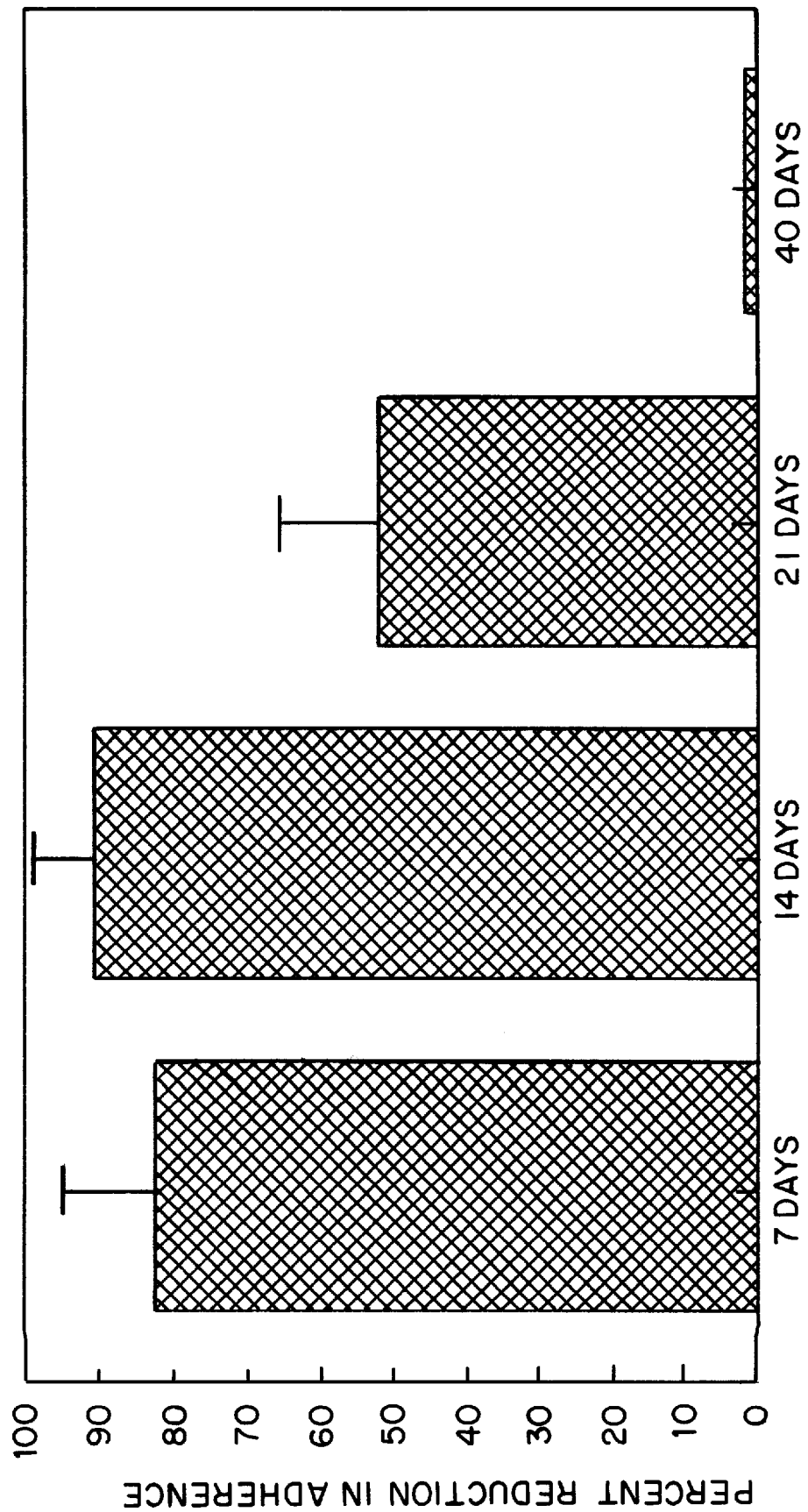
FIG. 3 is a plot showing reduction in bacterial adherence onto PVC in Lab RWS as measured by cfU/cm$^2$, wherein bars represent the mean reduction for two Lab RWS treated with 10 mg/L Pluronic P103 surfactant, and wherein brackets are standard errors.

Since the Pluronic EO/PO block copolymer surfactants showed greatest reduction in adherence in the screening assay, these products were investigated further in Lab RWS. Preliminary experiments (data not shown) indicated that a higher dosage of surfactant was required for minimization to occur under the more complex and dynamic conditions found in the Lab RWS. FIG. 2 compares biofilm plate count data for both treated and untreated CPVC cylinders. P103 surfactant was fed continuously to each system at a dosage of 10 mg/L and samples were collected 24 hours after exposure to the treatment. The figure shows individual measurements for each of six RWS. Note the mean values for both treated and untreated systems. These mean values were statistically different at an alpha value of 0.05 using analysis of variance. FIG. 3 presents data for reduction in adherence when treated with 10 mg/l P103 surfactant over a period of 40 days. The data shows that the surfactant was most effective over the first two weeks of exposure after which efficacy declines. There was virtually no effect after 40 days' exposure.

Figure 4:
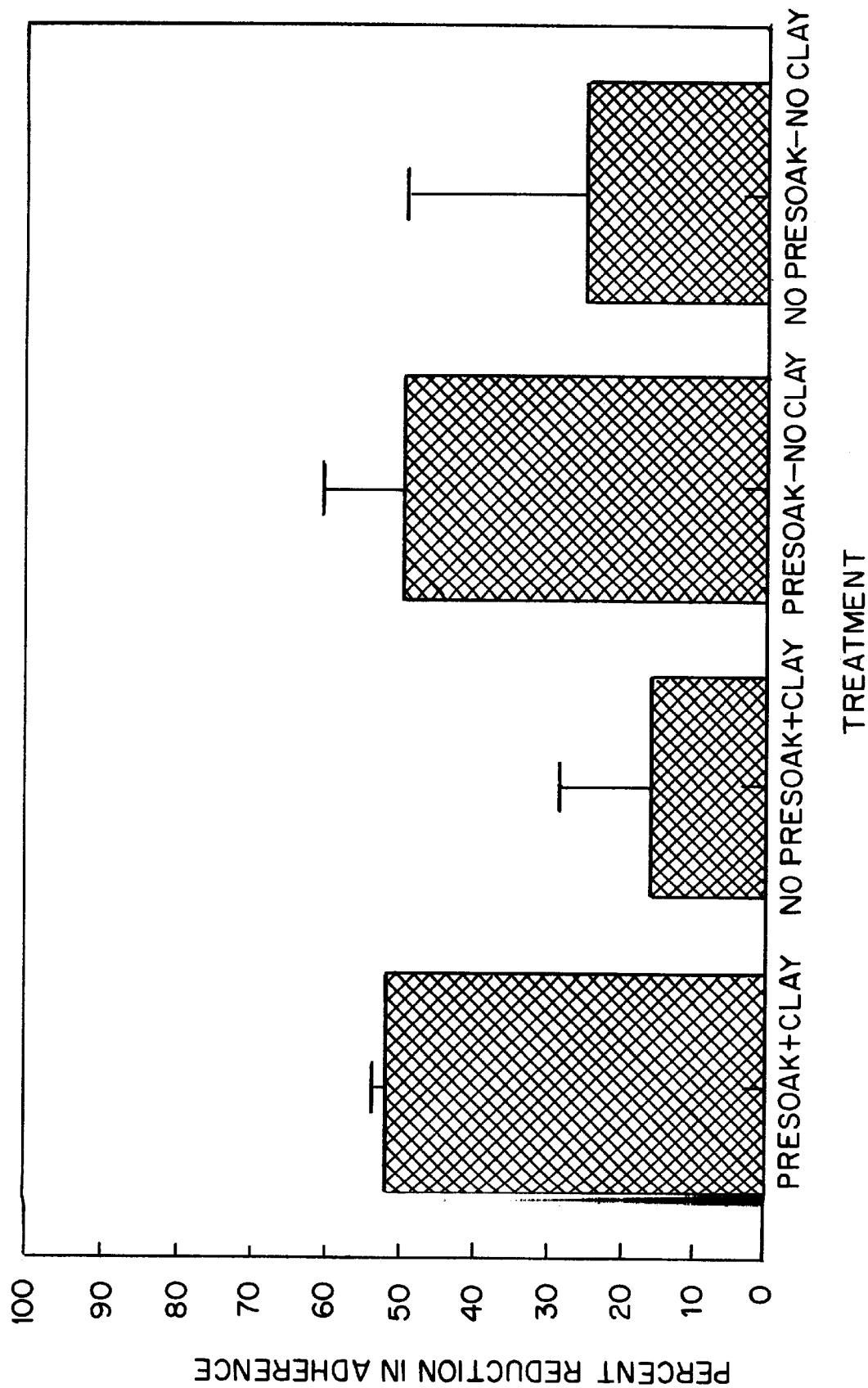
FIG. 4 is a plot showing the effect of presoaking PVC substrata in a 0.1% solution of Pluronic P103 surfactant and then placing in a Lab RWS treated with 10 mg/L Pluronic P103 for 24 hours, as measured by cfu/cm$^2$, and wherein each bar represents the percent reduction in bacterial adherence, brackets are standard errors, and 50 mg/L clay was added for Lab RWS treated with clay.

FIG. 4 shows results of experiments run to examine the effect of both clay feed and presoaking of the substrata in a 0.1% solution of the P103 surfactant for 18 hours prior to exposure. Presoaked and non-soaked CPVC cylinders were installed in Lab RWS and exposed to the test conditions for 24 hours. In treated systems, P103 surfactant was also fed at a continuous concentration of 10 mg/L. The data shows that whether or not the test systems contained added clay, presoaking provided a significant advantage. The effect of presoaking was similar regardless of whether clay was present. However, when cylinders were not presoaked, the addition of clay resulted in greater bacterial adherence (less reduction).

c. Field RWS Results

Figure 5:
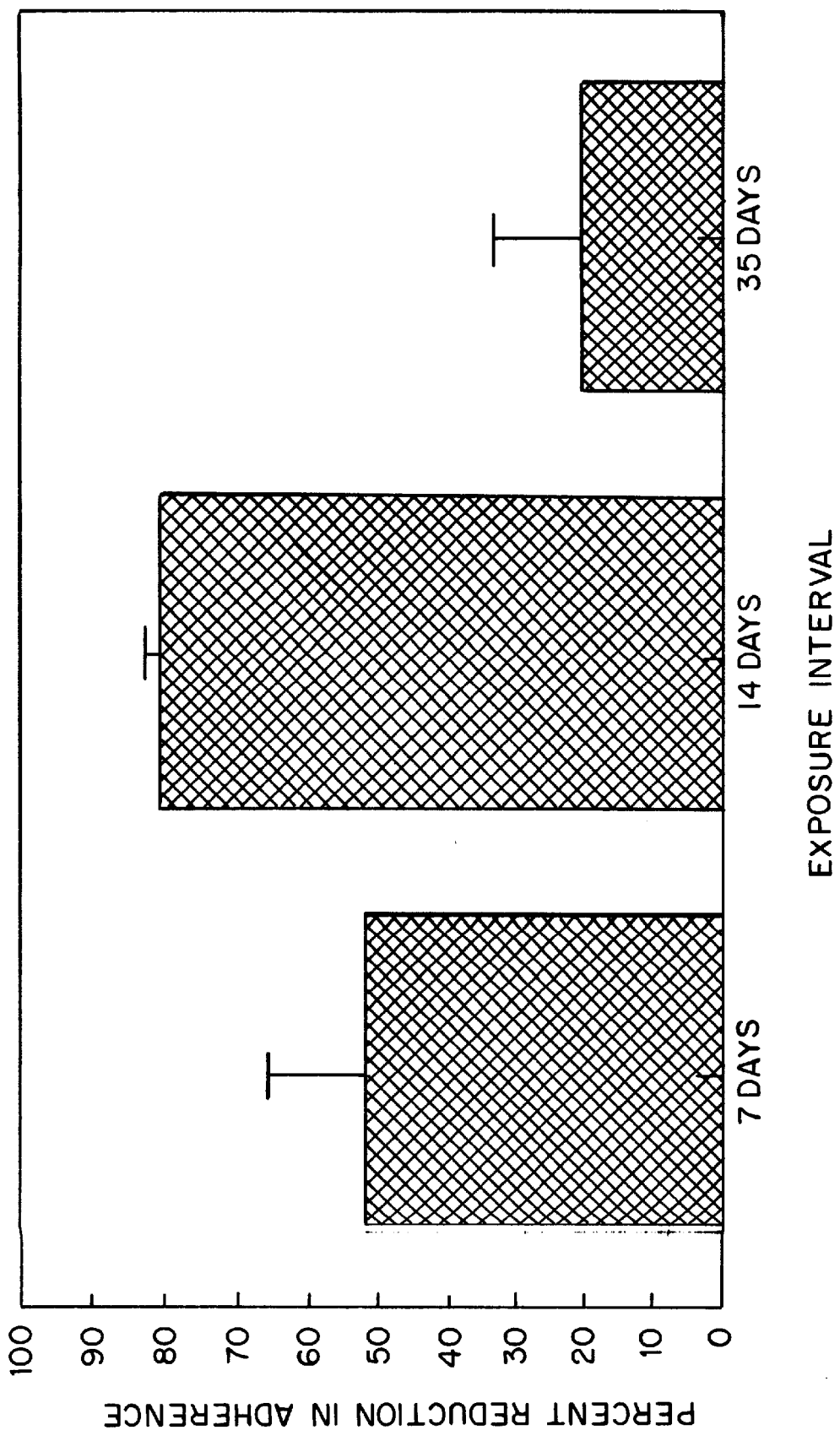
FIG. 5 is a plot showing the reduction in bacterial adherence onto PVC in Field RWS experiments as measured in cfu/cm$^2$, and wherein bars represent the mean reduction in single Field RWS treated with 50 mg/L Pluronic P103 surfactant, and brackets are standard errors.
Figure 6:
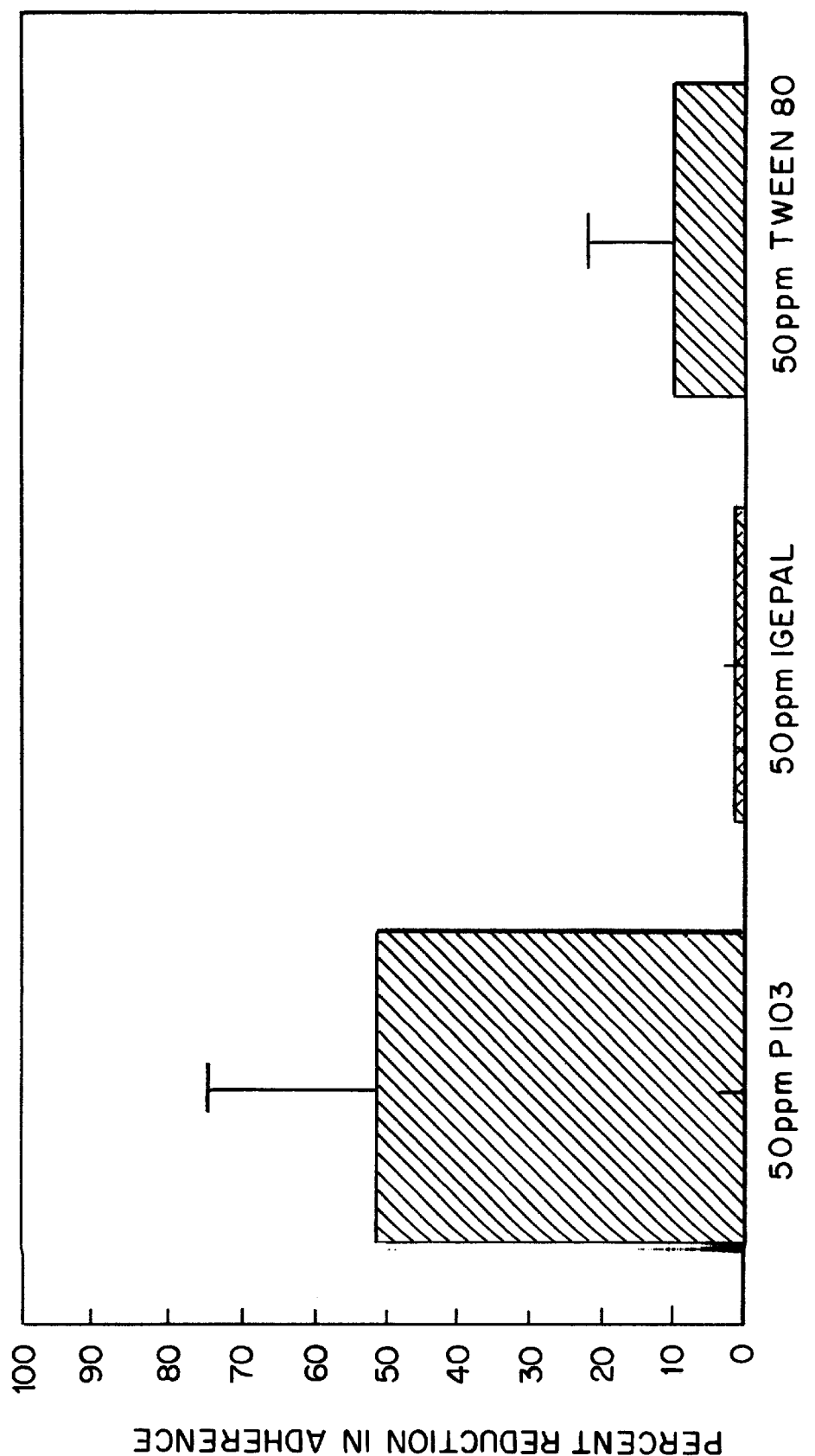
FIG. 6 is a plot showing the reduction in bacterial adherence onto PVC in Field RWS treated with different surfactants as measured by cfU/cm$^2$, and wherein bars represent the mean reduction in duplicate RWS, and brackets are standard errors.

FIG. 5 shows percent reduction in adherence when PVC substrata were exposed to 50 mg/L P 103 surfactant over an extended time interval in a Field RWS made up with plant recirculating cooling water. The surfactant reduced adherence up to 14 days after which the effect was diminished. This is a similar pattern to what was observed in lab studies (FIG. 3) and indicates that the window of greatest efficacy in terms of minimization is approximately 30 days. FIG. 6 shows a comparison between P103, Igepal CO-620, and Tween 80 surfactants. P103 outperformed the other two surfactants, both of which had minimal effect on reduction.

d. Studies Investigating Mechanisms of Surfactant Efficacy

Table 9 presents data showing the effect of P103 surfactant treatment on Zeta Potential of planktonic cells. For this experiment, four samples of water from a Lab RWS were collected. Two of these samples were further inoculated with cultures of bacteria (from a streak across an R2A plate count plate) in order to increase the number of cells in the sample. P103 surfactant (at 10 mg/L) was added to one inoculated and one uninoculated sample. Zeta Potential was determined on each sample. Results show first of all that Zeta Potential was much greater (larger negative number) in samples that were inoculated. Number of cells obviously had a significant effect on this measurement. Secondly, addition of P103 made no difference in Zeta Potential, whether or not the systems were inoculated.

TABLE 9

Effect on Pluronic P103 Surfactant on Zeta Potential

| Sample Indentification | Zeta Potential Mean | Zeta Potential S.D. |
|---|---|---|
| Untreated, Inoculated | −23.0 | 1.5 |
| P103 Treated, Inoculated | −22.2 | 1.5 |
| Untreated, Not Inoculated | −6.77 | 1.4 |
| P103 Treated, Not Inoculated | −7.13 | 1.5 |

Table 10 shows the effect of P103 surfactant on contact angle of PVC material. For this experiment, strips of PVC were placed into containers containing either deionized (DI) water or water collected from a lab recirculating water system (LRWS). To one DI water and one LRWS sample, 10 mg/L P103 was added and dynamic contact angle was determined. The results show that contact angle dropped dramatically when the PVC fill piece was exposed to the surfactant (98.9 to 74.5 and 90.0 to 66.1 degrees) indicating that the surfactant is altering the surface properties of the PVC.

TABLE 10

Effect of Pluronic P103 Surfactant on Dynamic Contact Angle of PVC

| Sample Identification | Advancing Contact Angle |
|---|---|
| PVC Fill/DI Water | 98.9 |
| PVC Fill/P103 in DI Water | 74.5 |
| PVC Fill/LRWS | 90.0 |
| PVC Fill/P103 in LRWS | 66.1 |

III. Discussion

The purpose of this work was twofold: (1) examine the effect of surfactants on bacterial adherence and (2) determine whether lab screening assays will predict performance of a treatment under more complex conditions (Lab and Field RWS). In order to address number 1, it was necessary to start with a large spectrum of surfactants, evaluate each for effect on adherence, and determine whether these products could be grouped according to ability to reduce adherence. The materials that worked well in the screening assay are structurally similar in one distinct feature, namely, the presence of ethylene oxide (EO) units. It is evident from the inventors' experiments that the more EO units, the better the materials perform in the assay.

The Silwet sample is a polysiloxane with pendent PEO grafts. It is believed that both components, the PEO and the silicone, will lower surface tension and alter the nature of biointerfaces. The Neodol 25-12 surfactant is a linear alcohol ethoxylate having a hydrophilic head group of about 12 EO units, with a hydrophobic tail of 12–15 carbons. The tail group, though considered linear, is sometimes branched with methyl groups. Apparently, higher EO levels are needed to give acceptable performance, noting that Neodol 25-7, with an average of 7 EO, and Neodol 91-2.5, with a shorter tail and an average of only 2.5 EO, did not perform as well.

The Pluronics are block copolymers of ethylene oxide (EO) and propylene oxide (PO) segments having the general structure.

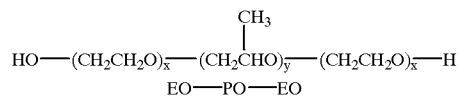

$$\text{HO}-(CH_2CH_2O)_{\bar{x}}-(CH_2CHO)_{\bar{y}}-(CH_2CH_2O)_{\bar{x}}-\text{H}$$
$$\text{EO}-\text{PO}-\text{EO}$$

The Pluronic 17R8, 25R2, 25R4, and 25R8 are PO-EO-PO blocks, while the F68, F108, L62D, L64, and P103 are EO-PO-EO blocks. Among the first type, the higher HLB samples were slightly better, with the 25R2 (HLB 1-7) the poorest, though giving acceptable performance at 94.4% reduction. The second type of material (EO-PO-EO) seems to be better overall. Here, HLB seems to have a stronger effect, noting that L62D does not work and has a very low HLB. In general, an HLB of 7 or greater seems to be essential. For ethoxylated nonionic surfactants, higher HLB values give greater water solubility. The results indicate that higher HLB surfactants are more effective in reducing bacterial adherence. The reason for the improved performance is believed to probably be twofold. First, since these surfactants have higher EO content, they will more effectively reduce bacterial adherence onto hydrophobic materials. Second, they are more water soluble, allowing more efficient dispersal in aqueous systems.

The sorbitan monooleate surfactants, which are modified with about 20 PEO units, also worked well. These types of materials have found use traditionally as dispersants and wetting agents. This material has an interesting structure for this type of adherence assay due to the presence of its sugar or polyol component in combination with its PEO component. Either of these or both may contribute to the observed performance.

The anionic and amphoteric surfactants showed no activity in this assay. These materials are not believed to contain EO or other functional groups which would readily deter adherence. Many of these are used as dispersing agents, but it is apparent from the inventors' results that there is no dispersancy mechanism operable in this system. That is, the microorganisms are not deterred to any extent by the presence of anionic or amphoteric dispersing agents. The cationic surfactant Varine T showed good activity, but this may be due to some biocidal activity as well as adherence reduction properties. Both mechanisms are operable and cannot be partitioned from this study.

Because screening studies pointed to the Pluronic products as being as or more effective than other surfactants, the inventors' further work then focused on these products. Since the surfactant P103 provided excellent reduction in adherence (99.7%), this product was used for testing in Recirculating Water Systems both in the lab and field. The RWS design allows for examination of surfactant performance under dynamic (flowing) conditions and in a milieu much more complex than for the screening assay, which is essentially the surfactant plus sterile phosphate buffered water. A consortia of microorganisms is inoculated into the Lab RWS, exposed to light and the low levels of organic and inorganic nutrients present in the tap water and from the growth of the algae in the system. It would be expected that a higher dosage of surfactant would be required to obtain a similar effect in terms of bacterial adhesion. This was the case: approximately 40 times the dosage was required to significantly minimize adhesion over a 24 hour period, and even then the percent reduction was less than 90%.

Over an extended period of exposure, it was found that the surfactant was most effective initially, during the first two weeks of exposure. Between 3 and 4 weeks exposure, adherence reduction became insignificant. The reduction in efficacy over time may be due to the surfactant film abrading off or biodegrading, or due to some bacteria breaching the surfactant barrier and colonizing the surface. Another explanation is that the surfactant interacts with the surface, but does not fully cover and protect the entire surface there are holes which allow for bacterial adhesion to the surface. These cells then multiply and develop biofilms, unaffected by the surfactant. Ultimately, the treated systems contain substrata which are colonized to the same extent as the untreated systems. This same phenomenon was observed in field studies (FIG. 5). Since data shown in FIG. 4 indicated that pre-coating the substratum surface with surfactant prior to exposure resulted in greater reduction in adhesion, it may be beneficial to pretreat new or clean fill material with P103.

The fact that addition of clay to the Lab RWS affected the ability of the surfactant to reduce adhesion (FIG. 4), indicates some type of interaction of the clay particles with either the surfactant, the cells, or the substratum surface. It is known that clay particles will interact with bacterial cells and extracellular polymers and so it is possible that a certain percentage of cells associated with clay particles might adhere differently than unattached cells. It is not clear from the literature whether these specific surfactants would interact with clay particles, but polymers, especially anionic and cationic polymers are commonly used as clay dispersants and so it is quite possible the nonionic products might perform similarly.

Experiments were run at a field site in order to evaluate the surfactant under more rigorous, highly variable conditions. Data shown in Tables 1 through 3 compare water chemistry and bulk water plate counts for lab and field RWS. Primary measured differences between these two systems were that field systems tended to have higher and more variable bulk water bacterial counts, higher suspended solids, and higher conductivity. Suspended solids were also higher in the Field RWS (Lab RWS suspended solids were not measured because turbidity appeared very low). Water temperatures tended to be slightly lower for the field installation, primarily because of the location of the test systems in the power plant.

A higher concentration (50 mg/L) of P103 was run to achieve significant reduction in bacterial adherence (FIG. 5 and 6). The observed differences between the two systems indicate that conductivity, suspended solids, or planktonic bacterial counts may have been responsible for this difference.

Both the Igepal CO620 and Tween 80 surfactants were evaluated in the Field RWS and neither one had a significant effect on adherence. The Tween 80, which worked quite well in the screening assay, worked slightly better than the Igepal, which was shown to be ineffective in the screening assay. This points out that results obtained from screening tests may not predict performance of the nonionic surfactants in more complex systems. In the case of the Pluronics and for the Igepal the screening was predictive, but in the case of the Tween 80 it was not.

Mechanism of action of the surfactants in limiting bacterial adhesion was investigated further using two different techniques. Zeta potential measurements indicated that cell surface charge was unaffected by the addition of the surfactant (Table 9). This indicates that the surfactant must be altering the surface of the substratum rather than the surface of the cells. This hypothesis was confirmed by experiments using a Kruss Surface Tensiometer for measurement of contact angle. The data in Table 10 shows that contact angle was significantly lowered after treatment with the surfactant. The surfactant was wetting the surface and causing it to become more hydrophilic.

Virtually any process or cooling water system subject to microbial fouling and biofilm formation could potentially benefit from treatment with P103 surfactant. Our findings have shown a clear benefit in reducing bacterial adhesion onto pvc surfaces in recirculating cooling water. It is also expected that P103 would reduce or control microbial adhesion onto materials other than polyvinyl chloride. For example, treatment of recirculating cooling water systems with P103 might be effective in reducing microbial adhesion and biofilm formation onto heat exchanger and system piping surfaces, as well as all cooling tower fill material surfaces. Other examples where applications of these surfactants could potentially reduce or control microbial adhesion follow. In pulp and paper manufacturing, microbial fouling of surfaces (and slime formation) may occur wherever these surfaces come into contact with microorganisms. This would include the thin stock loop systems, whitewater, freshwater supply tanks and piping, and all showers including those which use either freshwater, recirculated water, or saveall reclaimed water. Felts are subject to slime deposition, which leads to plugging of the felts, and addition of these surfactants to the water used for washing the felts might be effective. In general, the treatment of any aqueous system in a papermill with P103 surfactant could potentially alleviate or minimize microbial fouling.

Pluronic surfactants are already used in spray washers used for metal cleaning and surface finishing as antifoams. They may also provide an additional benefit by reducing microbial adhesion. In the manufacture of ceramics and sanitary ware, clay and other inorganics are molded in a water-borne process, followed by heating and other final steps. The P103 may assist in this process to prevent microbial adhesion. In clay slurries which contain dispersants, the P103 may act both as an agent to reduce microbial adhesion and as an optical brightening agent.

P103 may be useful in mouthwashes, since the PEO surfactants are currently used for this application. The P103 surfactants would provide the benefit of providing an effective product with less foam than other PEO surfactants. The use of P 103 also may inhibit the fouling of water craft, ships, and other structures which reside in water, where it is necessary to prevent attachment of microorganisms.

We claim:

1. A method for inhibiting adhesion of microorganisms to a hydrophobic surface in contact with a freshwater recirculating aqueous system, the method comprising adding at least 0.25 ppm of at least one compound comprising an ethoxylated nonionic surfactant which is block copolymer of repeating ethylene oxide and repeating propylene oxide units to the aqueous system.

2. The method of claim 1 wherein the surface is a plastic material.

3. The method of claim 2 wherein said plastic material is polyvinyl chloride.

4. The method of claim 1 wherein said block copolymer comprises first and second blocks of repeating ethylene oxide units and a block of propylene oxide units interposed between said first and second blocks of repeating ethylene oxide units.

5. The method of claim 4 wherein said block copolymer has the structure

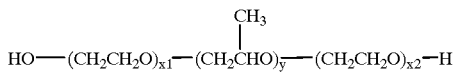

wherein x1, x2, and y are each independently 5–1000 and wherein said block copolymer comprises 20–80% ethylene oxide units by weight.

6. The method of claim 5 wherein the average molecular weight of said block copolymer is in the range of about 2000 to about 20,000.

7. The method of claim 1 wherein the microorganisms are bacteria.

8. The method of claim 6 wherein at least 50 ppm of said block copolymer is added to the aqueous system.

9. The method of claim 5 wherein said block copolymer has a hydrophilic-lipophilic balance that is 7 or greater.

10. The method of claim 1 wherein said block copolymer comprises first and second blocks of repeating propylene oxide units and a block of repeating ethylene oxide units interposed between said first and second blocks of repeating propylene units.

11. The method of claim 10 wherein said block copolymer has the structure

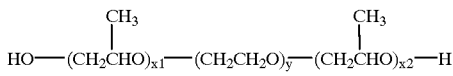

wherein x1, x2, and y are each independently 5–1000 and wherein said block copolymer comprises 20–80% ethylene oxide units by weight.

12. The method of claim 11 wherein the average molecular weight of said block copolymer is in the range of about 2000 to about 10,000.

13. The method of claim 1 wherein the aqueous system comprises a process or cooling water system.

14. The method of claim 11 wherein at least 50 ppm of said block copolymer is added to the aqueous system.

15. The method of claim 11 wherein said copolymer has a hydrophilic-lipophilic balance that is 7 or greater.

16. The method of claim 1 wherein said ethoxylated surfactant is a polysiloxane including pendent polyethylene oxide grafts.

17. The method of claim 1 wherein said ethoxylated surfactant is an alcohol ethoxylate including hydrophilic head groups and a hydrophobic tail groups.

18. The method of claim 17 wherein said hydrophilic head group comprises about 12 ethylene oxide units and said hydrophobic tail comprises 12–15 carbon atoms.

19. The method of claim 1 wherein said ethoxylated surfactant is a sorbitan monooleate including about 20 ethylene oxide units.

20. The method of claim 1 wherein the aqueous system comprises a pulp or papermaking system.

21. The method of claim 19 wherein at least 50 ppm of said ethoxylated surfactant is added to the aqueous system.

* * * * *

UNITED STATES PATENT AND TRADEMARK OFFICE
CERTIFICATE OF CORRECTION

PATENT NO.   : 6,039,965
DATED        : March 21, 2000
INVENTOR(S)  : Rodney M. Dolan et al.

It is certified that error appears in the above-identified patent and that said Letters Patent is hereby corrected as shown below:

Title Page, the title, "SURFANCTANTS" should read --SURFACTANTS--.

Column 1 Line 1 "SURFANCTANTS" should read --SURFACTANTS--.
(Applicaton Page 1 Line 5)

Column 3 Line 8 "cfU/cm$^2$" should read --cfu/cm$^2$--.
(Application Page 5 Line 6)

Column 3 Line 27 "cfU/cm$^2$" should read --cfu/cm$^2$--.
(Application Page 5 Line 17)

Column 6 Line 8, Table 1, last column "3 1 mg/L" should read --31 mg/L--.
(Application Page 10, Table 1, last column of second row)

Column 13 Line 14 after "entire surface" insert a dash (-).
(Application Page 24 Line 20)

Column 14 Line 48 "P 103" should read --P103--.
(Application Page 27 Line 16)

Signed and Sealed this

Third Day of April, 2001

*Attest:*

NICHOLAS P. GODICI

*Attesting Officer*   Acting Director of the United States Patent and Trademark Office